Dec. 19, 1933.    C. W. McKINLEY    1,940,316
LIQUID FILTER
Filed July 30, 1932
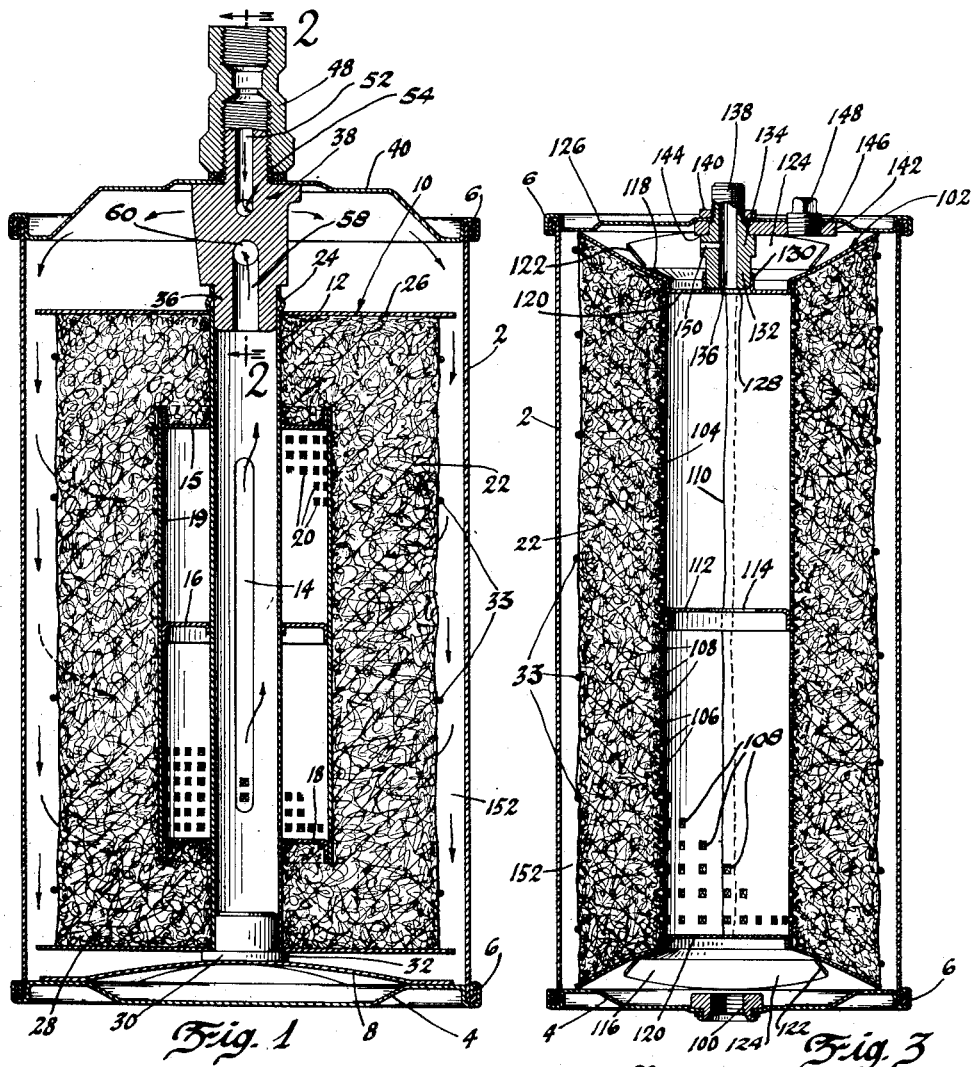
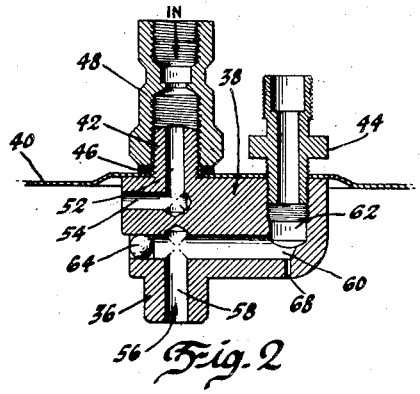
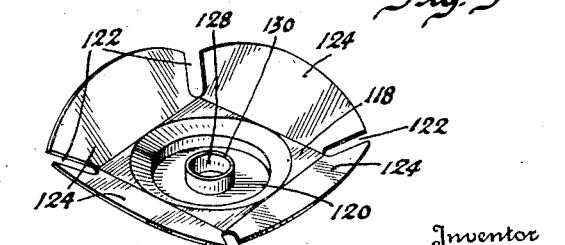
Inventor
Charles W. McKinley
By Blackmore, Spencer & Flint
Attorneys Patented Dec. 19, 1933

1,940,316

UNITED STATES PATENT OFFICE 1,940,316

LIQUID FILTER

Charles W. McKinley, Flint, Mich., assignor to A C Spark Plug Company, Flint, Mich., a company of Michigan Application July 30, 1932. Serial No. 626,429

7 Claims. (Cl. 210—183)

This invention relates to oil filters and has particular reference to the type of oil filter used in connection with the lubricating system of internal combustion engines used on automotive vehicles.

The object of the invention is to construct a filter which is very cheap, is easily assembled, and will be composed of very few parts. In accomplishing the object of the invention use is made of a central perforated column to which there are attached end pieces having resilient or yieldable fingers formed thereon. A filter medium surrounds the column and is positioned between the end pieces and in placing the filtering unit in the usual container the spring fingers on the end pieces will be in contact with the container ends and be pressed inwardly to some extent so that the resilient fingers rigidly and permanently will hold the unit in the container and prevent rattle.

On the drawing:

Figure 1 is a sectional view through one form of filter construction.

Figure 2 is a section on the line 2—2 of Figure 1.

Figure 3 is a sectional view through a modified and preferred form of filter.

Figure 4 is a perspective view of one of the end pieces of Figure 3.

Referring to Figure 1, the numeral 2 indicates the outer container having the bottom 4 secured thereto by the crimped over edge portions 6. Inside the container there is positioned at the bottom the spring plate 8 upon which there rests the filtering unit indicated as a whole at 10. The filtering unit comprises the central column 12 having the one or more slots 14 to allow for the passage of oil. Secured to the column 12 are the three spacer members 15, 16 and 18 which support the screen-like member 19 provided with perforations 20 throughout its extent. The screen 19 is secured to the spacers 15, 16 and 18 and serves to space the filtering material 22 from the outlet column 12 and the slots 14 thereof.

The upper portion of the column 12 has a bead 24 against which there fits the upper end piece 26. At the lower portion of the column 12 there is secured the bottom piece 28 and a plug 30 closes the lower end of the column 12 while the head or flange 32 thereof holds the lower end piece 28 in position. The head 32 rests on the plate 8. The filtering material 22 is positioned between the end pieces and surrounds the screen 19. The filtering material may be of any suitable type, but is preferably loose cotton waste which may be slightly compacted and held away from the container 2 by means of the screen, cords or wire 33.

The upper end of the central column 12 is left open and is adapted to receive the reduced portion 36 of the inlet-outlet fixture 38 secured to the cover 40 of the filter. The manner in which the fixture 38 is secured is best shown in Figure 2 from which it will be seen that the fixture has the inlet nipple 42 which projects through a suitable opening in the cover 40 and the outlet nipple 44 which extends through an opening in the cover and is screwthreaded into the fixture 38. A gasket 46 surrounds the nipple 42 and a suitable inlet fitting 48 is screwed on to the nipple and permanently holds the fixture on the cover. The top 40 is secured to the container 2 by crimping shown at 6.

The inlet nipple 42 has the inlet passage 52 which has a right angular extension 54 to direct the oil into the interior of the filter.

The outlet passage is shown at 56 and includes the right angularly extending passages 58, 60 and 62. The end of the passage 60 is plugged as indicated at 64 to prevent the contaminated oil from flowing from the inlet 54 to the passage 60.

A suitable spring pressed-ball-pressure-relief-valve may be connected to the passage 60 to permit the flow of unfiltered oil to the outer passage 62 in case the filtering material 22 is plugged or clogged. In practice a restricted opening 68 is preferred to the pressure relief valve. The opening 68 is not large enough to prevent the pressure of the usual pump from forcing the oil through the filter but will allow the by-passing of sufficient oil when the filter is clogged or plugged. This opening 68 will prevent a stop in the oiling system if the filter should refuse to function.

The operation of the structure of Figures 1 and 2 is as follows: The oil from the pump or other suitable part of the lubricating system will enter the filter at the inlet fitting 48 and pass through the passage 52 to the interior of the filter as shown by the arrows in the upper part of Figure 1. The oil will flow to the filtering material as indicated by the arrows at the right and left hand portions of Figure 1, pass through the filtering material through the screen 19 into the slots 14 and up the tube or column 12 and through the outlet passage 56 to the outlet fitting 44 and to the working parts of the engine or back to the crank case. A quantity of unfiltered oil always will be by-passed through the opening 68.

The preferred form of the invention is shown in Figures 3 and 4 in which there are the usual container 2, the bottom member 4 and filtering material 22. In the species of Figure 3 a drain opening 100 is provided in the bottom 4 which is closed by a suitable plug not shown. If desired the drain may be omitted or the opening 100 may be used as the oil inlet. The filtering unit 102 comprises the central perforated column 104 which is formed of a flat sheet of metal having the portions 106 pressed outwardly therefrom to form openings 108 to allow the passage of oil. The flat sheet is rolled into circular form and secured together at its meeting edges 110 by soldering or any other suitable way. If desired, a spacer 112 having an opening 114 at its middle may be placed at the center of the column 104 although this is unnecessary.

Secured in each end of the column 104 are the lower end piece 116 and upper end piece 118. Each end piece 116 or 118 has the projecting portion 120 which fits into the end of the column. The projecting portions may be left unsecured, but are preferably secured in the column by soldering.

Each end piece 116 or 120 has a plurality of cutouts 122 forming therebetween the fingers 124. The fingers are bent to the position shown in Figures 3 and 4 and as the pieces are of metal the fingers will have a sufficient amount of resiliency so that when the top 126 of the container 2 is secured by crimping the edges as at 6, the filtering unit 102 will be tightly held in the container and the fingers will be slightly compressed inwardly so that when the filter is assembled there will be no rattle or movement of the filtering unit 102 in the container.

Referring to Figure 3 it will be noted that the projecting portion 120 of the lower end piece 116 is integral or has no opening so that no oil will pass therethrough.

The upper end piece 118 has a central opening 128 formed by pressing upwardly a sleeve of metal 130 from the center of the projection 120. In this sleeve 130 there is received the reduced end 132 of an inlet fitting 134. The inlet fitting has a bore 136 to allow for the egress of oil and is provided with a threaded portion 138 which extends through an opening container. The fitting 134 is secured to the top 126 by means of the nut 140.

A plate 142 is positioned between the inside of the cover 126 and a shoulder 144 on the inlet pipe and has a threaded opening 146 adapted to receive the inlet pipe for the lubricant. In the Figure 3 the opening 146 is shown closed by a plug 148 to prevent entrance of dirt before the application of the filter to the engine lubricating system.

The filter unit 102 is completely assembled before it is placed in the filter and when positioned in the filter the fingers 124 will cause the unit to project somewhat above the upper edge of the container. When the cover 126 is placed in position and forced down so that it may be crimped at 6 to seal the container, the act of forcing the cover 126 on the container will spread the fingers 124 or bend them toward each other tightly to hold the unit in the container and to compress somewhat the outer portion of the filtering material 22.

A small opening 150 is provided in the fitting 134 inside the filter, the purpose of which is to act as a by-pass and to perform the functions of the usual pressure relief valve and corresponds to the opening 68 of Figure 2. The oil filter of Figure 3 is incapable of filtering all the oil handled by the pump of the lubricating system of an internal combustion engine and in order to allow a passage of oil through the system when the filtering material is plugged or clogged, the opening 150 is provided. This opening is not of such a size that it will prevent the pressure of the system from forcing the lubricant entering the inlet 146 through the filtering material but it will always allow a certain portion of contaminated oil to by-pass the filter. If the filter should become clogged the increased pressure will force a greater amount of oil through the opening 150.

In its operation the oil will enter the inlet 46 and flow over the ends of the fingers 124 particularly at the parts where the cutout portions 122 are located. The lubricant will flow to the space indicated at 152, pass through the filtering material 22, through the openings 108 in the screen 104 and out through the outlet passage 136.

I claim:

1. In a filter, a container, a filtering unit in said container comprising a central hollow perforated core, end pieces secured to said core, fingers formed on said end pieces, said fingers being placed under tension between the ends of the container when in assembled position tightly to hold the filtering unit in the container, and a filtering medium between said end pieces and surrounding said core.

2. In a filter, a container, a filtering unit in said container comprising a central hollow perforated core, end pieces secured to said core, fingers formed on said end pieces, said fingers being placed under tension between the ends of the container when in position tightly to hold the filter unit in the container, an oil outlet in one of said end pieces, and a filtering medium between said end pieces and surrounding said core.

3. In a filter, a container, a filtering unit in said container comprising a central hollow perforated core, end pieces secured to said core, fingers formed on said end pieces, said fingers being placed under tension between the ends of the container when in position tightly to hold the filter unit in the container, one of said end pieces permanently closing one end of said core, an outlet in the other end piece, and a filtering medium between said end pieces and surrounding said core.

4. In a filtering unit, a central hollow perforated column, end pieces secured to said column, each piece being integral and of metal and having a plurality of cutout portions to form fingers therebetween, and a filtering medium surrounding said column and positioned between said end pieces.

5. In a filtering unit, a central hollow perforated column, end pieces, projecting portions on said end pieces secured in the ends of the column, resilient fingers on the end pieces, and a filtering medium surrounding the column and positioned between the end pieces.

6. In a filtering unit, a central hollow perforated column, end pieces, projecting portions on said end pieces secured in the ends of the column, resilient fingers on the end pieces, an oil outlet in one of said projecting portions, and a filtering medium surrounding the column and positioned between the end pieces.

7. In a filtering unit for insertion in a container, a central hollow perforated member, end pieces, projecting portions on said end pieces fitting in the ends of said member, resilient fingers on the end pieces adapted rigidly to hold the unit in the container, and a filtering medium surrounding said member and positioned between said end pieces.

CHARLES W. McKINLEY.